May 14, 1957 L. F. RICKETTS ET AL 2,792,056
GUARD FOR TIRE INFLATION
Filed June 28, 1954 2 Sheets-Sheet 1
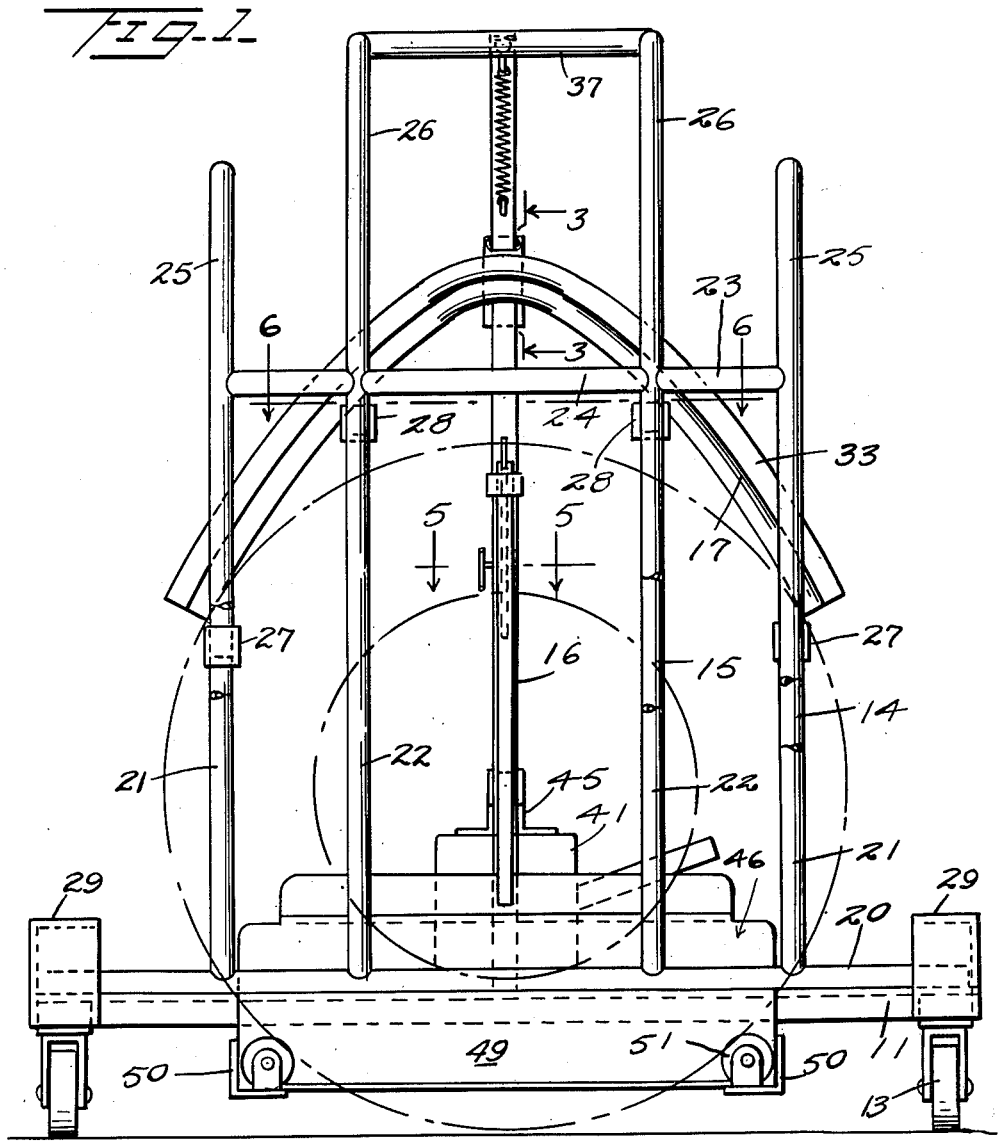
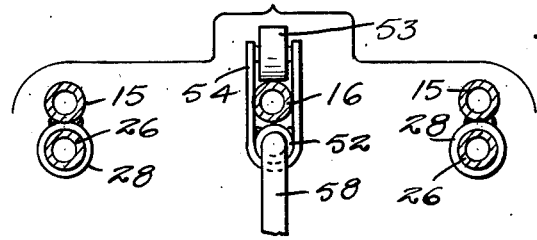
INVENTORS
L. F. Ricketts
R. J. Kuhlmeier
W. J. Watts
BY
Kimmel & Crowell ATTORNEYS

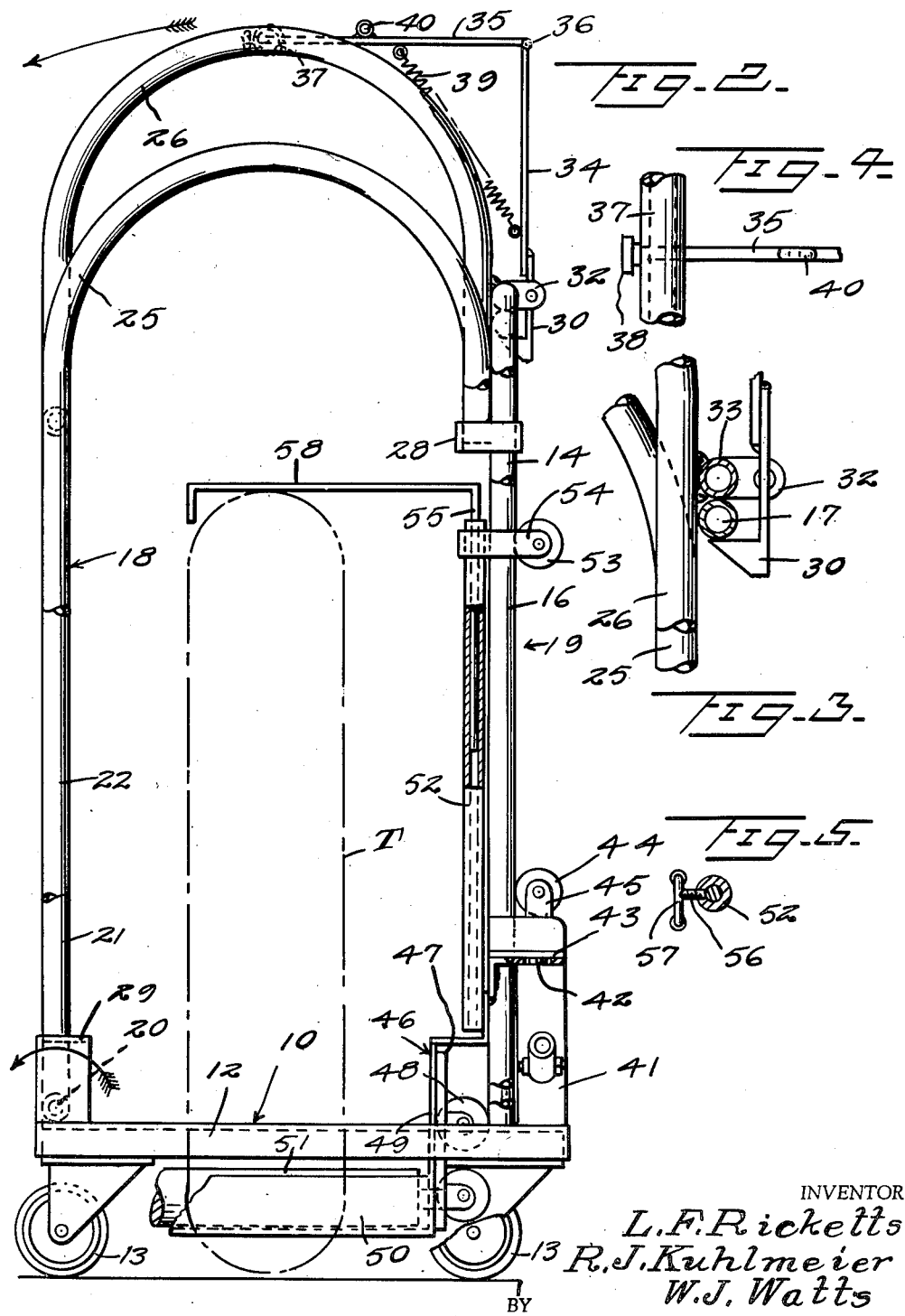

2,792,056
GUARD FOR TIRE INFLATION

Louis F. Ricketts, Raymond J. Kuhlmeier, and Willard J. Watts, Lawrenceburg, Ind.

Application June 28, 1954, Serial No. 439,522

2 Claims. (Cl. 157—1)

This invention relates to a guard for large wheels and tires.

In the mounting of tires on trucks, buses or other large vehicles, the tires are held on the rims by means of a ring. When the tires are repaired and are replaced on the rim, it frequently happens that the rim is insecurely mounted so that when the tire is inflated the air pressure forces the ring off of the rim with sufficient force to cause serious injury to the workman. It is therefore an object of this invention to provide a guard for holding the tire during the inflation thereof so that if the ring should be blown off the workman will not be injured.

Another object of this invention is to provide a tire guard which is formed with a removable side, so that when the tire is inflated the workman will be protected during the attachment of the wheel to the axle of the vehicle.

A further object of this invention is to provide a tire guard which includes means for vertically adjusting the tire so as to align the bolt holes with the bolts.

A further object of this invention is to provide tire guard which will permit the complete handling of the tire by one person regardless of the size and weight of the tire and wheel.

With the above and other objects in view, my invention consists in the arrangement, combination and details of construction disclosed in the drawings and specification, and then more particularly pointed out in the appended claims.

In the drawings:

Figure 1 is a detail front elevation of a tire guard constructed according to an embodiment of this invention.

Figure 2 is a detail side elevation, partly broken away and in section, of the device.

Figure 3 is a fragmentary sectional view taken on the line 3—3 of Figure 1.

Figure 4 is a fragmentary plan view of the guard release.

Figure 5 is a sectional view taken on the line 5—5 of Figure 1.

Figure 6 is a sectional view taken on the line 6—6 of Figure 1, illustrating the arrangement of certain elements of the tire holding mechanism and the adjacent pair of offset sockets and portions of their respective pipes.

Referring to the drawings, the numeral 10 designates generally a base mobile frame which is formed of a pair of longitudinal frame bars 11 and a pair of end frame bars 12. Caster wheels 13 are secured to the bottom of the frame 10 whereby the frame may be readily moved over a plane surface.

The base frame 10 has fixed to the rear thereof an outer pair of upright pipes 14, and a second inner pair of upright pipes 15, with a central upright pipe 16. The frame bars 14, 15 and 16 are fixed at their upper ends to an inverted V-shaped pipe 17.

A detachable front guard frame, generally indicated at 18, is engageable with the base frame 10, and the rear frame, generally indicated at 19 and comprising the upright pipes 14, 15 and 16, and the V-shaped pipe 17. The front frame 18 includes a lower horizontal pipe 20 with an outer pair of vertical pipes 21 fixed at the lower ends to the horizontal pipe 20.

An intermediate pair of vertical pipes 22 are secured at their lower ends to the horizontal pipe 20, and the upper ends of the pipes 21 and 22 are connected together by horizontal connecting pipes 23 and 24.

The outer pair of pipes 21 have extending upwardly and rearwardly therefrom substantially semi-circular pipes 25, and the intermediate pipes 22 which project at their upper ends above the connecting pipes 23 and 24 have extending upwardly and rearwardly therefrom substantially semi-circular pipes 26.

The lower rear ends of the arcuate pipes 25 are engageable in keeper sockets 27 which are fixed to the pipes 14, and the rear ends of the pipes 26 are releasably engageable in keepers or sockets 28 which are secured to the pipes 15 adjacent the inverted V-shaped pipe 17.

The horizontal pipe 20 releasably engages at the opposite ends thereof in a pair of rearwardly opening boxes 29 which are fixed to the forward corners of the base frame 10.

A spring-pressed dog 30 is pivotally mounted between a pair of ears 32 which are fixed to a second V-shaped pipe 33. The pipe 33 is welded or otherwise fixed to the rear sides of the pipes 25 and 26 above the lower free ends thereof.

The pawl or latching member 30 has extending upwardly therefrom a lever 34, and a pawl operating rod 35 is pivotally secured as at 36 to the upper end of the lever 34. The rod 35, as shown in Figure 4, is slidable through a transverse upper connecting bar 37 which connects the upper portions of the bars 26 together, and a knob 38 is fixed to the end of the bar 35.

A spring 39 is connected between lever 34 and rod 35 so as to constantly urge the dog or locking member 30 to a locking position beneath the upper portion of V-shaped pipe 17.

A projection 40 is fixed to the upper side of rod 35 and provides a hand grip whereby rod 35 may be readily moved forwardly to latch-releasing position.

A jack housing 41 is carried by the base frame 10 at the rear thereof, and the jack structure 41 has a plate 43 fixed to the plunger thereof at 42.

A roller 44 is rotatably disposed between a pair of ears 45 secured to the plate or head 43 and is adapted to engage the rear side of the central pipe 16 which forms a guide for a vertically movable carriage generally indicated at 46.

The carriage 46 includes a plate 47 having a pair of rollers 48 fixed to the rear side thereof which are adapted to engage the forward side of guide pipes 16 and 15 as the carriage 46 is raised upwardly. The carriage 46 also includes an end bar 49 which is secured as by welding or the like to a pair of horizontally disposed and forwardly projecting angle bars 50.

As used herein, the expression "pipe" means pipe or bar.

A roller 51 is rotatably carried by each angle bar 50 and is adapted to be engaged by a tire T when the tire is disposed within the guard structure. A vertically disposed tube 52 is fixed at its lower end to the carriage 46 and projects on the forward side of guide member 16.

A roller 53 is rotatably carried by a pair of rearwardly projecting ears 54 which extend rearwardly from the upper end of the tube 52. A vertically adjustable tire holding rod 55 engages in the tube 52 and is secured in adjusted position by means of a set screw 56 having a handle 57 at the outer end thereof.

The rod 55 has extending horizontally and forwardly therefrom an inverted L-shaped tire holding member 58 which is engageable over the top of the tire T so as to hold the tire T in steady and vertical position to facilitate the attachment of the tire to the wheel of the vehicle.

In the use and operation of this device, the tire T is initially mounted on the rim or disc of the wheel and prior to the inflation of the tire and the tire is inserted within the guard structure and the front and rear guard elements are placed in operative position.

With the tire T disposed within the guard structure the tire is then inflated and if the locking ring should be thrown off due to improper seating of the ring on the rim of the wheel the ring will be contained within the guard structure so that the operator will not be injured when the rim is suddenly and forcibly thrown off of the tire and wheel structure.

Assuming that the tire T has been inflated without the locking ring being thrown off, the front removable guard structure 18 is taken off of the base 10 by first releasing the locking member 30, then lifting the guard structure 18 out of socket members 27 and 28 and moving horizontal bar 20 rearwardly out of the boxes 29.

The remaining guard structure including the base 10 and rear structure 19 is then moved into confronting position to the wheel or axle of the vehicle and carriage 46 is raised or lowered by the jack 41 until the tire T is in proper alignment for firmly securing the tire and rim and other elements to the wheel and axle.

By providing the rollers 51 the tire can be rotated so as to provide for alignment of the bolt holes with the bolt holes in the wheel structure, and the bolts or other fastening means may then be applied with the tire T held within the rear guard structure 19 and on the base 10. By providing the rear guard structure 19 for protection of the workman during the applying of the tire and rim to the wheel, the workman is thoroughly protected until the wheel and tire have been firmly mounted.

With a guard structure as hereinbefore described the tire and rim may be removed and replaced by one person whereas heretofore due to the weight of the tire it has been necessary for two or more persons to attend to the removal and replacement of the tire and at all times there has been the extreme hazard of the locking ring being suddently blown off from the rim and thereby seriously injuring one or more of the workmen. With a guard structure as hereinbefore described the job can be performed by one person and that person is thoroughly protected at all times.

What is claimed is:

1. A tire guard comprising a mobile base frame, upright rear frame bars fixed to said base frame, a removable front guard frame formed of a lower horizontal bar, upright bars fixed to said lower bar, rearwardly projecting bars extending from said second-named upright bars, downward projections integral with said rearwardly projecting bars, keepers carried by said first-named upright bars in which said downward projections are adapted to engage, a pair of rearwardly opening boxes carried by said base frame in which said horizontal bar engages, means latching said front guard frame in operative position, and means carried by said base frame supporting a tire in upright position.

2. A tire guard comprising a mobile base frame, upright rear frame bars fixed to said base frame, a removable front guard frame formed of a lower horizontal bar, upright bars fixed to said lower bar, rearwardly projecting bars extending from said second-named upright bars, downward projections integral with said rearwardly projecting bars, keepers carried by said first-named upright bars in which said downward projections are adapted to engage, a pair of rearwardly opening boxes carried by said base frame in which said horizontal bar engages, means latching said front guard frame in operative position, and a pair of tire supporting rollers carried by said base frame.

References Cited in the file of this patent

UNITED STATES PATENTS

| | | |
|---|---|---|
| 2,407,049 | Winarsky et al. | Sept. 3, 1946 |
| 2,490,233 | Schildmeier | Dec. 6, 1949 |
| 2,538,473 | Russell et al. | Jan. 16, 1951 |